H. ANHALTZER.
TIRE.
APPLICATION FILED JULY 3, 1915.

1,255,974.

Patented Feb. 12, 1918.

WITNESSES

INVENTOR
H. Anhaltzer
by C. C. Luthicum
his Attorney

UNITED STATES PATENT OFFICE.

HENRY ANHALTZER, OF PITTSBURGH, PENNSYLVANIA.

TIRE.

1,255,974.  Specification of Letters Patent.  Patented Feb. 12, 1918.

Application filed July 3, 1915. Serial No. 37,836.

*To all whom it may concern:*

Be it known that I, HENRY ANHALTZER, a citizen of the United States, and resident of Pittsburgh, in the county of Allegheny and State of Pennsylvania, have invented certain new and useful Improvements in Tires, of which the following is a specification.

My invention relates to the construction of vehicle tires, and while not limited to such use, more particularly to tires for automobiles and similar motor vehicles.

One object of my invention is to provide a tire having novel means for expanding the tire shoe and for yieldingly holding the shoe in expanded position on the wheel to which the tire is applied for use.

Another object of my invention is to provide novel means whereby the inner tubes of existing pneumatic tires may be dispensed with, the difficulties caused by puncturing the inner tubes are avoided and overcome, and the life of the tires is materially increased.

A further object of my invention is to provide a vehicle tire having improved means whereby the tire is secured on the rim of the wheel in applying the tire for use.

A still further object of my invention is the provision of the novel combination and arrangement of parts shown in the drawings, more fully described hereinafter, and to be specifically pointed out in the appended claims.

Referring now to the drawings forming part of this specification, Figure 1 is a transverse section of a tire constructed and arranged in accordance with my invention.

Figure 1:
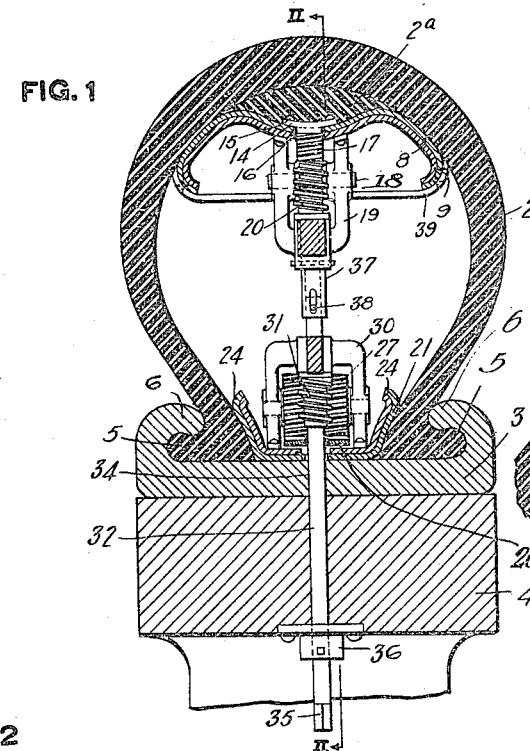

In the accompanying drawings, the numeral 2 designates the hollow annular casing or shoe of my improved tire which preferably is formed of rubber coated fabric, made in the usual known manner, and 3 is a metal rim which may be secured on the felly 4 of a wheel in any desired manner.

The tire casing 2 may be of any of the various well-known clencher or detachable types, and my invention is applicable for use with any of the numerous existing pneumatic tires. As shown the casing 2 is provided with beads 5, 5, which engage with the hook flanges 6, 6, on the metal rim 3 in the usual manner.

Positioned within the hollow casing or shoe 2 is an expansible metal band or ring 7 having overlapping ends 8 and 9 which are arranged to slide on one another in expanding within the casing to distend the tire casing on the wheel.

Figure 3:
Fig. 3 is a transverse section showing a detail of the cross section of the metal expanding ring forming part of my improved tire.

In the construction shown the expansible ring 7 has inwardly turned curved side edges 10, 10, connected by curved portions 11, 11, to reversely curved portions 12, 12. The curved portions 12 form a circumferential depression in the metal ring and a stiffening bead or rib 13 which extends substantially from end to end of the ring connects the curved portions 12, 12, of the metal ring. Actually this rib extends from the inner end of the slot in the end 8 to the inner end of the slot 16 in the other end 9 of the ring 7 (see Fig. 3).

The ring 7 is made of spring steel and on account of its peculiar cross section may be made of very thin flexible material. An annular ring $2^a$ of soft elastic rubber is positioned within the groove formed on the outer surface of the ring by the curved portions 12, 12, of the ring.

Secured on the overlapping end 8 of the ring 7 is a toothed bar or rack 14 which is permanently fastened to the end of the ring by means of rivets or bolts 15, as shown, or by welding or other approved manner.

The other overlapping end 9 of the ring 7 is provided with a slot 16, and extending through this slot with its teeth in mesh with the teeth of the rack 14 is a toothed wheel 17. The wheel 17 is rotatably secured by a pin or shaft 18 to the bracket bearing 19 which is riveted or otherwise secured to the overlapping end 9 of the metal ring 7. Also mounted on the bracket bearing 19 is a worm 20 which meshes with the teeth of the wheel 17 by means of which the toothed wheel 17 is rotated, in expanding and contracting the expansible ring 7 within the casing 2, and by which the ring 7 is locked in expanded position.

With some forms of tire casings, such as that shown, it is necessary to provide means for fastening the casing on the metal rim 3 of the wheel to which the tire is applied.

As shown a metal ring 21 is employed having overlapping ends 22, 23, the ring 21 contracting in diameter in fastening the tire casing 2 on the wheel.

The metal ring 21, like the expansible ring 7, has curved inturned edges 24, 24, which avoid cutting of the fabric composing the casing or shoe and has a bead or rib 25 in the middle of the width thereof to strengthen the ring and enable it to be made of very thin and elastic metal.

A rack 26 is secured to the overlapping end 23 of the ring 21 and a toothed wheel 27 is arranged to mesh with the teeth in the rack 26 in contracting and expanding the ring 21.

In this construction the rack 26 is provided with a slot 28 and the wheel 27 has a face of sufficient width to extend across the slot 28 in the face of the rack 26.

The toothed wheel 27 is mounted by a pin 29 on the bracket bearing 30 which is secured to the other overlapping end 22 of the expanding ring, and a worm 31 is mounted on the bracket bearing so as to mesh with and rotate the toothed wheel 27 when the worm is turned.

The shaft or stem 32 for the worm 31 extends through the slot 28 and registering slot 33 in the end 23 of the ring 21 and through the registering opening or hole 34 in the metal wheel rim 3 and felly 4 of the wheel, and the inner end of this stem 32 is provided with a squared portion 35 to enable the stem to be turned by a key or wrench. A keeper 36 is secured to the inner surface of the felly to retain the stem 32 in position and prevent endwise movement thereof.

The shaft or stem 37 for the worm 20 is connected at its inner end to one end of the stem or shaft 32 for the second worm 31. As shown, the end of the shaft 32 extends into the opening in the inner end of the shaft 37 for the worm 20, and a pin 38 extends through a transverse hole in the shaft 32 into the slotted opening in the end of the other shaft 37 so as to permit of a relative endwise movement of the shafts 32 and 37.

A strap 39 is secured on the overlapping end 8 of the expansible ring 7 so as to permit relative sliding movement of one end on the other, while preventing separation of the overlapping ends of the rings in a radial direction, and similar straps may be employed on the ends of the ring 21 when desired.

Figure 2:
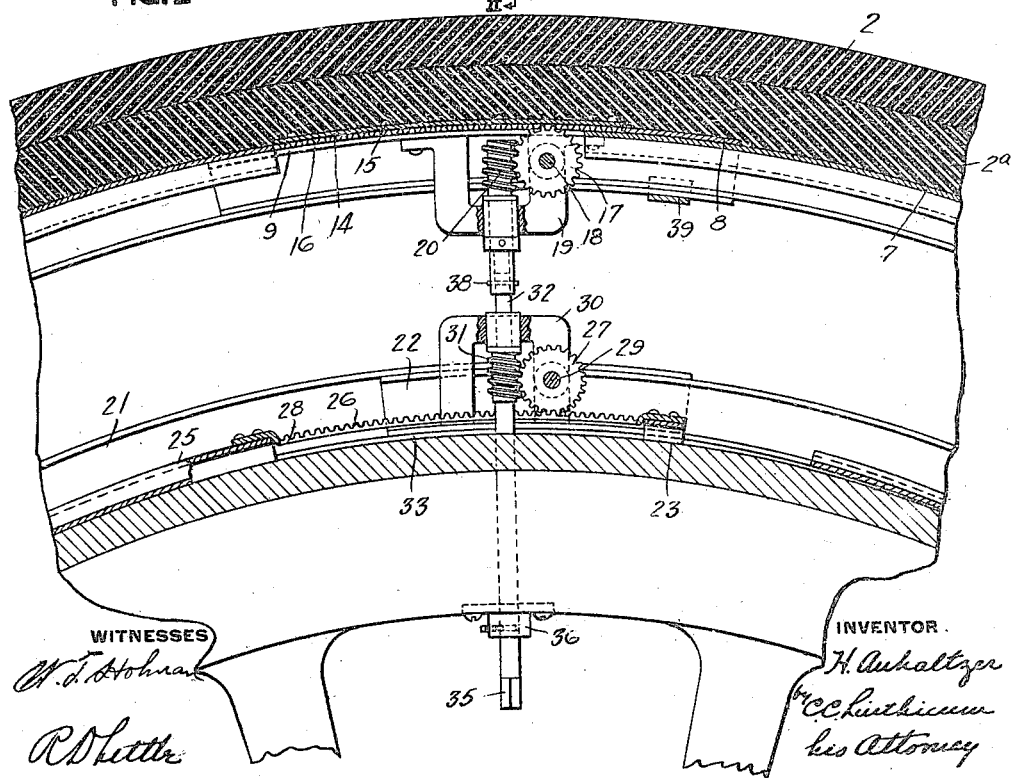
Fig. 2 is a longitudinal section on the line II—II of Fig. 1, showing details in the construction and arrangement of the parts forming my improved tire.

In applying my improved tire to a wheel the expanding ring 7 is placed within the casing 2 with the worm 20 and toothed wheel 17 in operative position on the overlapping end 9 thereof, as shown in Figs. 1 and 2. The contracting ring 21 with its ends in overlapping position is then put into the casing and the adjoining ends of the shafts 32 and 37 for the worms 20 and 31 are operatively connected by a relatively endwise movable joint in the manner shown.

After the rings 7 and 21 are inserted in the shoe or casing 2 the casing is placed in position on the metal rim 3 with the beads 5, 5, in engagement with the hook flanges 6, 6, of the metal rim.

The shaft 32 is then turned manually by means of a wrench or key so as to rotate the worm 20, and when this worm is rotated the toothed wheel 17 also rotates. Rotation of the toothed wheel 17 causes the overlapping ends of the expanding ring 7 to move relatively to one another. The expanding ring 7 will be expanded within the casing 2 so as to bring its surfaces into close contact with the adjacent surfaces of the hollow fabric tire or shoe 2 and will distend the tire by continued rotation of the worm wheel to the desired extent.

At the same time the other worm 31 rotates the toothed wheel 27 and through engagement of this wheel with the teeth of the rack 26 on the contracting ring 21 will contract the ring into engagement with the metal surface of the metal rim 3 of the wheel into the position shown in the drawing. When in this position the side faces formed by the bent sides of the contracting ring will engage with and tightly hold the beaded ends 5, 5, of the hollow casing or shoe 2 in position and prevent movement thereof on the rim 3. When the expansible ring has been expanded to the desired extent it will remain in its expanded position, the worm forming a lock which positively prevents relative movement of the overlapping ends 8 and 9 of the ring 7. The worm 31 acts in a similar manner to lock the contracting ring 21 in contracted position on the rim 3.

In using tires formed in accordance with my invention the resiliency of the tire is maintained while the difficulties met with in the use of pneumatic tires employing an inner tube are avoided and overcome.

The casing may be punctured without resulting trouble, and the load on the tire will be transmitted through the resilient woven rubber covered shoe to the rim of the wheel in the usual manner. The portions of the tire adjacent to that on the ground tend to bulge outwardly, while the same portions of the shoe or casing above the axis of rotation are stretched or put in tension so that the tire will have the same elastic qualities as the ordinary pneumatic tire.

The advantages of my invention will be apparent to those skilled in the art. By the use of my metal expanding ring within the hollow shoe or casing the casing is kept in distended position, and the usual inner tube, inflated with compressed air, is dispensed with. The tire is easily and cheaply constructed, and the expanding ring is applicable to existing shoes without change other than replacing the usual inner tube with the expanding ring.

Modifications in the construction and arrangement of parts may be made without departing from my invention. Means other than those shown may be employed for expanding the ring in the shoe and for holding the shoe in expanded position. The expanding and locking mechanism for the expansible ring may be arranged to operate independently of the contracting ring when desired. The cross sectional contour of the expanding ring may be changed and other variations may be made within the scope of my invention as defined in the appended claims.

I claim:—

1. In a tire the combination with a hollow elastic casing, and a metal wheel rim on which said casing is removably mounted, of an expansible metal ring within the hollow casing, and means for expanding the ring to distend the casing, said means comprising a rack carried by one end of the metal ring and having its teeth exposed through a slot formed in the other end thereof and an actuating means including a toothed wheel arranged for coöperation with said rack.

2. In a tire the combination with a hollow elastic casing, and a metal wheel rim on which said casing is removably mounted, of an expansible metal ring within the hollow casing, and means for expanding the ring to distend the casing, said ring having inwardly turned curved side edges connected by intermediate curved portions to reversely curved central portions forming a circumferential depression in the outer surface of the metal ring, and an integrally formed inwardly extending hollow bead like rib connecting said reversely curved central portions of the ring.

3. In a tire the combination with a hollow elastic casing, and a metal wheel rim on which said casing is removably mounted, of an expansible metal ring within the hollow casing, means for expanding the ring to distend the casing, said ring having inwardly curved side edges connected by intermediate curved portions to reversely curved central portions, said central portions forming a circumferential depression in the outer surface of the metal ring, an integrally formed inwardly extending hollow bead like rib connecting said reversely curved central portions of the ring, and an annular ring of soft rubber within said circumferential depression.

4. In a tire the combination with a hollow elastic casing, and a metal wheel rim on which said casing is removably mounted, of an expansible metal ring within the hollow casing and means for expanding the ring to distend the casing, said means comprising a rack carried by one end of the metal ring and having its teeth exposed through a slot formed in the other end thereof and a toothed wheel on said other end of the metal ring arranged for coöperation with said rack, and means including a worm meshing with said toothed wheel for actuating said expanding means and arranged to lock said expanding means in adjusted position.

5. In a tire the combination with a hollow elastic casing, and a metal wheel rim on which said casing is removably mounted, of an expansible metal ring and a contractile metal ring within the casing, and means for expanding and contracting said rings within the casing, said means comprising a rack on one end and a coacting toothed wheel on the other end of each ring, a worm meshing with each of said wheels, and means for rotating said worms, said worms being arranged to rotate the wheels in expanding and contracting said rings, and coacting with the wheels to form a lock for holding the rings in adjusted position.

In testimony whereof I have hereunto set my hand.

HENRY ANHALTZER.

Witnesses:
EMMA LEA MONTGOMERY,
M. P. ALEXANDER.

Copies of this patent may be obtained for five cents each, by addressing the "Commissioner of Patents, Washington, D. C."